2,897,077
PLUTONIUM-URANIUM-TITANIUM ALLOYS

Arthur S. Coffinberry, Los Alamos, N. Mex., assignor to the United States of America as represented by the United States Atomic Energy Commission No Drawing. Application April 10, 1957
Serial No. 652,069

4 Claims. (Cl. 75—122.7)

This invention relates to alloys of plutonium and in particular to alloys of plutonium which may be used as nuclear reactor fuels.

Although uranium²³⁵ has generally been used as the fuel or active material in nuclear reactors, in certain nuclear reactor applications it is more desirable to use plutonium as the active material. This is particularly true when the neutronic reactor is to operate with a neutron flux of fast or epithermal energies, such as, for example, the fast plutonium reactor described in AEC Report LA–1679.

Some nuclear reactors, in addition to providing a useful neutron or heat flux, provide a means for creating new active material or fuel within the reactor. These are known as breeder reactors. In a breeder reactor, the breeding ratio depends upon the excess of the number of neutrons born over the number lost in capture including fission, and assuming no leakage, so that $$R = \text{breeding ratio} = \frac{\nu - 1 - \alpha}{1 + \alpha} \quad (1)$$

where $R > 1$ for useful breeding,
where $\nu$ = average number of neutrons per fission,
and $\alpha = s_c/s_f$ where:
$s_c$ = capture cross section
$s_f$ = fission cross section.

TABLE I

| | $U^{235}$ | R | $Pu^{239}$ | R |
|---|---|---|---|---|
| $\nu$ | 2.5 | | 2.9 | |
| $\alpha$ (slow neutrons: .03 e.v.) | .185 | 1.11 | .540 | 0.883 |
| $\alpha$ (epithermal neutrons: 1 e.v.) | .250 | 1.00 | .305 | 1.22 |

When the values of Table I are inserted in Equation 1, it can be seen that in a reactor operating with thermal neutrons, $U^{235}$ is suitable as a breeder fuel but $Pu^{239}$ is not, as $\alpha$ for $U^{235}$ at thermal energies is low enough to provide a breeding ratio (R) greater than 1. However, at epithermal energies, $Pu^{239}$ is suitable as a breeder fuel as $\alpha$ for $Pu^{239}$ is low enough to provide an $R > 1$, and as can be seen by Table I, $U^{235}$ is not suitable.

It may be seen then that the breeding ratio for $Pu^{239}$ in the epithermal range may be considerably greater than 1 but is barely 1 for $U^{235}$. Since a breeding ratio must be appreciably greater than 1 to be useful, $U^{235}$ is not practical as an epithermal reactor breeder core material.

Pure plutonium may be used in a non-breeder fast reactor but its use has several disadvantages. One of the disadvantages of the use of pure plutonium is that the plutonium is consumed during the operation of the reactor and the fuel element must be replaced or reprocessed periodically as a certain percentage of the plutonium is "spent." Another disadvantage to the use of pure plutonium is that all of the heat is generated in a small volume of material with attendant difficulties of cooling.

In order to reduce the intensity of heat generation in the plutonium, the use of diluents with plutonium has already been suggested but other problems occur. When most diluents are added to plutonium, the neutrons tend to be moderated, thus increasing the parasitic capture in plutonium 239 to form plutonium 240. Furthermore, diluents have also been found to create competing neutron reactions which also decrease the effectiveness of the reactor for breeding. Likewise, from a metallurgical standpoint, such alloys of plutonium commonly have phase structures which give the metal undesirable properties.

When $Pu^{240}$ is formed in a fast reactor it adds to the reactivity as it is a fast fission material. However, $Pu^{240}$ in a reactor whose neutrons have been slowed down acts as a non-fissile material, since it increases non-fission capture. Thus the neutrons captured in producing $Pu^{240}$ in a thermal reactor are lost to the fissile system.

However, in a fast breeder reactor, new plutonium atoms created in uranium add to the reactivity of the reactor. The uranium in such a reactor may be integral in the plutonium core or surround the core as a blanket. The ratio of uranium to plutonium may vary over wide ranges for operative reactors. Thus the percentage of uranium may be up to 90 percent and still achieve a practical breeding efficiency.

Since the parasitic capture of neutrons in the reaction $$Pu^{239} + n \rightarrow Pu^{240}$$

increases with a decrease of neutron energy, the reactor core must contain materials which will not appreciably moderate fast neutrons. $U^{238}$ is allowable up to about 90 percent of the plutonium-uranium ratio.

Binary alloys of uranium and plutonium have been produced but they possess very bad characteristics for fabrication, machining, casting and corrosion resistance. These alloys are brittle and glass-like, cannot be cast without many minute cracks and are found to corrode readily. The poor qualities of the uranium-plutonium alloys may be attributed to the presence of the zeta phase. Further, a plutonium-uranium binary alloy is very subject to corrosion in a gaseous or aqueous environment.

It is therefore an object of the present invention to provide an alloy containing uranium and plutonium which can be cast or fabricated free of cracks.

Another object of the present invention is to provide an alloy containing uranium and plutonium which is relatively resistant to corrosion.

Another object of the present invention is to provide an alloy containing plutonium and uranium which has not more than one-half zeta phase by volume.

Another object of the present invention is to provide an alloy containing uranium and plutonium which may be used as the fuel element in a fast breeder reactor.

The objects of this invention are attained by the production of a multi-component alloy in which the plutonium to uranium ratio is between 10 to 50 atoms of plutonium and 90 to 50 atoms of uranium, said alloy containing from 15 to 60 atomic percent of titanium.

The metallurgical properties of the alloy of this invention make it a practical, workable material having desirable characteristics in nuclear reactors. Instead of the usual brittle alloy full of minute cracks, the subject alloy can be machined with relative ease and is easy to fabricate. The casting properties are excellent, as sound crack-free castings are easily made. The alloy is also more resistant to radiation damage than the binary plutonium-uranium alloy, and by comparison to the plutonium-uranium binary is exceedingly more corrosion resistant.

In particular, titanium does not substantially moderate fast or epithermal neutrons nor does it show any substantial parasitic neutron capture for neutrons having energies greater than thermal.

The uranium in the alloy will be converted to plutonium while the fast reactor operates, thus spent fuel is automatically replaced and at the same time the volume of the plutonium-containing material will be larger than pure plutonium to facilitate cooling.

The alloys of this invention are prepared by any one of several methods. They may be prepared by melting the weighed amounts of the constituents in a vacuum induction furnace whereby the metals are mixed through the stirring action of the induction field. Alternately pure titanium or titanium fluoride can be added to a mixture of plutonium fluoride and uranium fluoride and the alloy produced by co-reduction of the fluorides using the technique given in copending application S.N. 543,630, by Richard D. Baker, filed October 28, 1955, entitled "Recovery of Metals of the Second Rare Earth Series From Scrap, the subject matter of which is incorporated herein by reference. In addition to the methods suggested, any methods used in the art for preparing plutonium or uranium alloys may be used for preparing the alloy of the present invention.

In the alloy of the present invention, the preferred phase has a hexagonal crystal structure. The nominal composition is $(U, Pu)_2Ti$. A structure of this type is formed when the total uranium and plutonium is from about 58 to 68 atomic percent of the alloy of the present invention. Thus, the remaining 32 to 42 atomic percent consists of titanium. With less than 32 atomic percent titanium, but more than 15 percent, sufficient hexagonal crystal structure is found to give the desired properties also. Also, when from 42 to 60 atomic percent of Ti is added, sufficient hexagonal crystal structure is formed to give the desired properties.

*Example I*

To prepare an alloy of the present invention, for example, 51.2 grams of plutonium, 153.0 grams of uranium, and 22.1 grams of titanium (about 35 atomic percent) are placed in a magnesia crucible in a vacuum or inert atmosphere, heated by induction furnace means to at least 1000° C. and kept at this temperature for about 5 minutes. Then the alloy is either poured in a mold or allowed to cool in the crucible.

*Example II*

To prepare, for example, an alloy of the present invention by the co-reduction method, 68 grams of $PuF_4$, 202 grams of $UF_4$, 96 grams of calcium, and 65 grams of iodine are placed in a magnesia crucible with 22 grams of titanium. The crucible is either evacuated or placed in an inert atmosphere. The crucible is then heated by induction means at 300° C. to react the calcium with the fluorine. After the calcium has combined with the fluorine the crucible may be cooled and the alloy recovered from the bottom of the crucible.

Titanium does not substantially moderate fast or epithermal neutrons nor does it show any substantial parasitic neutron capture for neutrons of energy greater than slow.

Other embodiments to this invention may be apparent to those skilled in the art and therefore this invention is not limited by the foregoing specification, but only by the appended claims.

What is claimed is:

1. A neutronic reactor fuel alloy consisting essentially of from 15 to 60 atomic percent titanium with the remainder uranium and plutonium in the ratio of from 90 to 50 atoms of uranium to 10 to 50 atoms of plutonium, the predominant phase constituent of said alloy having a hexagonal crystal structure of the $(U,Pu)_2Ti$ type.

2. A neutronic reactor fuel alloy consisting essentially of from 32 to 42 atomic percent titanium with the remainder uranium and plutonium in the ratio of from 90 to 50 atoms of uranium to 10 to 50 atoms of plutonium, said alloy being composed essentially of a hexagonal crystal structure of the $(U,Pu)_2Ti$ type.

3. A neutronic reactor fuel alloy consisting essentially of from 15 to 60 atomic percent titanium with the remainder uranium and plutonium in the ratio of from 90 to 50 atoms of uranium to 10 to 50 atoms of plutonium, said alloy having no more than one-half zeta phase by volume.

4. A neutronic reactor fuel alloy consisting essentially of from 32 to 42 atomic percent titanium with the remainder uranium and plutonium in the ratio of from 90 to 50 atoms of uranium to 10 to 50 atoms of plutonium, said alloy having no more than one-half zeta phase by volume.

References Cited in the file of this patent

UNITED STATES PATENTS 2,743,174     Keeler et al. _____ Apr. 24, 1956

OTHER REFERENCES

Finniston et al.: Progress in Nuclear Energy, Series V, Metallurgy and Fuels, pub. 1956 by McGraw-Hill Book Co., Inc., New York, N.Y., pp. 396–409.